US009370897B1

(12) United States Patent
Dinsmore

(10) Patent No.: US 9,370,897 B1
(45) Date of Patent: Jun. 21, 2016

(54) DEVICE FOR FOLDING MASKING TAPE

(71) Applicant: Brian A. Dinsmore, Logan, IA (US)

(72) Inventor: Brian A. Dinsmore, Logan, IA (US)

( * ) Notice: Subject to any disclaimer, the term of this patent is extended or adjusted under 35 U.S.C. 154(b) by 0 days.

(21) Appl. No.: 14/635,112

(22) Filed: Mar. 2, 2015

(51) Int. Cl.

*B65H 45/22* (2006.01)
*B29C 65/50* (2006.01)
*B05C 21/00* (2006.01)
*B29L 31/30* (2006.01)

(52) U.S. Cl.

CPC ........... *B29C 65/5085* (2013.01); *B05C 21/005* (2013.01); *B29C 65/5007* (2013.01); *B29C 65/5071* (2013.01); *B29C 65/5092* (2013.01); *B29L 2031/3055* (2013.01); *Y10T 156/101* (2015.01); *Y10T 156/1011* (2015.01)

(58) Field of Classification Search

CPC ........... B65H 35/0026; B65H 35/0033; B65H 3/004; B29C 65/5071; Y10T 156/101; Y10T 156/1011

See application file for complete search history.

(56) References Cited

U.S. PATENT DOCUMENTS

| | | | | | |
|---|---|---|---|---|---|
| 2,749,966 | A * | 6/1956 | Roetger | B29C 65/18 | 156/201 |
| 2,842,201 | A * | 7/1958 | Vogt | B65H 35/0026 | 206/409 |
| 2,889,146 | A * | 6/1959 | Thompson | B65H 35/0026 | 30/124 |
| 3,038,982 | A * | 6/1962 | Ludlow | B29C 65/18 | 118/60 |
| 4,576,674 | A * | 3/1986 | Le Tarte | B31F 1/0029 | 156/463 |
| 5,672,233 | A * | 9/1997 | Hall | B29C 53/48 | 156/203 |
| 6,502,616 | B1 * | 1/2003 | Row | B65H 35/0006 | 156/463 |
| 6,945,297 | B1 * | 9/2005 | Gonzalez | B65H 35/0026 | 156/463 |
| 2001/0000096 | A1 * | 4/2001 | Tolerico | B65H 35/0026 | 156/200 |
| 2004/0238109 | A1 * | 12/2004 | Gonzalez | B65H 35/0026 | 156/227 |
| 2006/0131356 | A1 * | 6/2006 | Imazeki | B65H 35/0026 | 225/6 |
| 2009/0242120 | A1 * | 10/2009 | Pellegrino | B32B 27/10 | 156/324 |

* cited by examiner

*Primary Examiner* — Mark A Osele

(74) *Attorney, Agent, or Firm* — Dennis L. Thomte; Thomte Patent Law Office LLC

(57) ABSTRACT

A device for use with a masking tape dispensing cart or the like is disclosed wherein the device is capable of folding the masking tape upon itself as the masking tape is pulled from a roll of masking tape on the dispensing cart. The device includes a roller over which the masking tape is pulled which partially folds the tape upon itself. The masking tape is then pulled over a deflector plate which further folds the masking tape upon itself. The masking tape is then passed over an elongated spring provided on the dispensing cart which presses the folded portion of the tape onto the adhesive under-side of the tape.

4 Claims, 5 Drawing Sheets

DEVICE FOR FOLDING MASKING TAPE

BACKGROUND OF THE INVENTION

1. Field of the Invention

This invention relates to a device for folding masking tape and more particularly to a device which may be mounted on a masking tape dispensing apparatus to fold the masking tape as it is being dispensed from the apparatus.

2. Description of the Related Art

In the field of painting automobiles, structures and other objects, it is often desirable to “mask” a portion of the object prior to painting to prevent application of paint to that portion. For example, when spray painting the edge of a car door or trunk lid, it is often desirable to mask the edge of the door or trunk lid, whereby paint is applied to the exterior-facing door panel, but not to the interior side portions of the door that are not exposed when the door is closed.

Self-adhesive tape, commonly known as masking tape, is commercially available in strip form, in a variety of widths, for use in masking prior to painting. The tape typically is adhesive on a first face, and non-adhesive on a second face opposite the first face. The tape is typically provided in rolls, whereby a long, continuous strip of tape is wrapped about a tubular hollow core.

It has been found to be further desirable, in many instances, to provide a smooth transition between the painted (unmasked) portion and the unpainted (masked) portion rather than a stark, clearly-defined line as would normally occur where tape was applied to the object before painting and the tape removed after painting. It is known to apply a sponge rope material such as Soft-Edge Foam, commercially available from 3M Corp., Minneapolis, Minn., having a generally circular cross-section and an adhesive coating or strip applied along its length at the edge of the object to be painted, whereby a tapered channel or space is formed between the painted object and the outer circumference of the sponge rope. Sprayed paint will enter this tapered space to some extent and will be applied to the painted object to a greater extent at the entrance to the space and to a progressively lesser extent further into the space. At the point of adhesion, no paint will be applied. In this manner, the application of paint fades relatively smoothly from the painted portion to the unpainted portion of the object.

The sponge tape, however, is very expensive. In an effort to reduce expenses, but still provide a smooth transition between the unmasked painted portion and the masked unpainted portion, it is known to manually fold one edge of the adhesive face of a length of masking tape upon itself, thereby forming a strip of tape having a face that is adhesive along one edge (the unfolded edge) and non-adhesive along the other edge (the folded edge). This strip of tape is then applied to the edge of the object to be painted, with the adhesive edge adhered to the object and the non-adhesive edge tapering away from the object, to form a tapered space between the tape and the object to be painted. When paint is sprayed in the area of the tape, some paint enters this tapered space in much the same manner as with the sponge rope, fading progressively from the entrance of the space toward the point of adhesion of the tape. The effort required to manually fold the tape, however, is relatively time-consuming and, therefore, is expensive in its own right.

The apparatuses of U.S. Pat. Nos. 4,576,674; 6,502,616; and 6,945,297 have been previously provided in an effort to solve the problems set forth above. However, the devices of the above-identified patents are cumbersome to use and are very expensive to manufacture. Further, the devices of the above-identified patents are not believed to be readily attached or incorporated into existing masking tape dispensers.

Accordingly, a need exists for an economical way of folding an adhesive face of masking tape upon itself. It is to the provision of an apparatus and method meeting this and other needs that the present invention is primarily directed.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A masking tape folding device is provided for use with a masking tape dispenser having a roll of masking tape rotatably mounted thereon about a horizontal axis with the masking tape having an upper side, an adhesive lower side, a first side edge and a second side edge.

The device of this invention comprises a vertically disposed mounting plate which is configured to be secured to the dispenser and which is spaced from the roll of masking tape. The mounting plate has an upper end, a lower end, a first end, a second end, an inner side and an outer side. The mounting plate has a horizontally disposed first support member which extends inwardly from the upper end of the mounting plate. The first support member has inner and outer ends. The mounting plate also has a vertically disposed second support member which extends upwardly from the inner end of the first support member. The second support member has a first end, a second end, a lower end, an upper end, an inner side and an outer side. The second support member includes an inclined deflector plate portion which extends upwardly and inwardly therefrom at the second end thereof. The deflector plate portion has an upper surface, a lower surface, an upper end and a lower end. The second support member has a first opening form therein adjacent to the first end thereof which is adjacent to the upper end thereof. A horizontally disposed roller support shaft is positioned in the first opening. The roller support shaft has an inner end which is positioned inwardly of the second support member. A roller is rotatably mounted on the inner end of the roller support shaft. The second support member has a generally v-shaped notch formed therein which extends downwardly thereinto from the upper end thereof to the lower end of the deflector plate portion. The roller is positioned on the mounting plate whereby a portion of the masking tape being pulled from the roll of masking tape will engage the roller and pass thereover thereby causing the second edge of the masking tape to be partially folded downwardly. The deflector plate is positioned relative to the roller whereby the partially folded second edge of the masking tape will subsequently engage the upper surface of the deflector plate portion thereby causing the folded second edge of the masking tape to be further folded towards the adhesive lower side of the masking tape as the masking tape is pulled from the roll of masking tape.

The masking tape dispenser further includes a spring for pressing the folded second edge of the masking tape into adhesive engagement with the adhesive lower side of the masking tape after the masking tape has disengaged from the deflector plate portion.

It is therefore a principal object of the invention to provide an improved masking tape folding device for use with a masking tape dispenser.

A further object of the invention is to provide a masking tape folding device for use with a masking tape dispenser which is economical of manufacture, durable in use and refined in appearance.

A further object of the invention is to provide a masking tape folding device for use with a masking tape dispenser which does not require any modification of the masking tape dispenser other than mounting the device to the masking tape dispenser.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
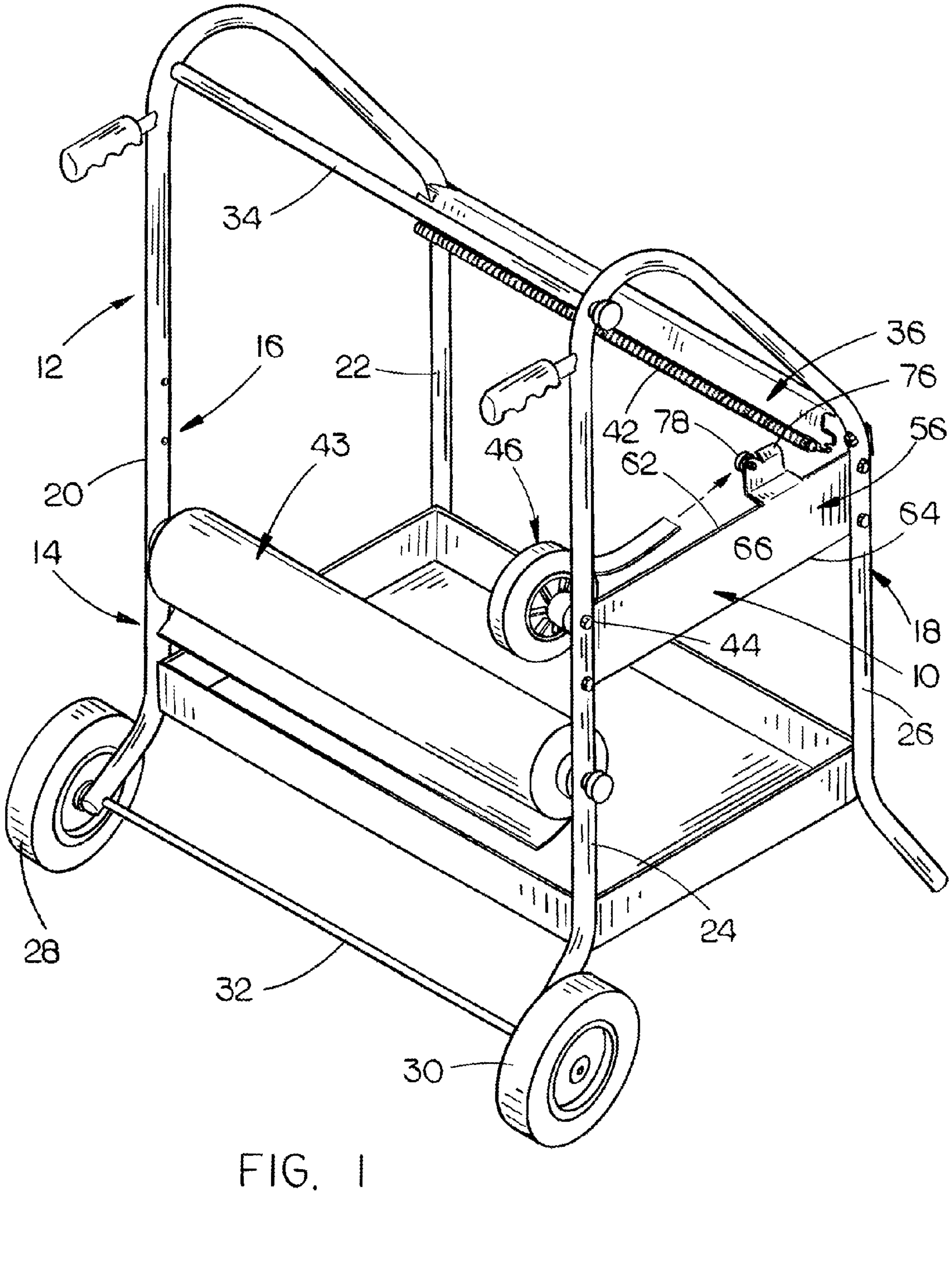
FIG. 1 is a perspective view of a masking tape dispensing cart having the device of this invention noted thereon.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the device of this invention which is mounted on a prior art masking tape and masking paper dispenser cart 12 which is commonly used in the automotive repair and paint business. The prior art cart or dispenser 12 includes a wheeled frame 14 having side frame members 16 and 18. Side frame member 16 includes a rear leg member 20 and a front leg member 22 which extends forwardly and downwardly from the upper end of rear leg member 20. Side frame member 18 includes a rear leg member 24 and a front leg member 26 which extends downwardly and forwardly from the upper end of rear leg member 24.

The rear leg member 20 has a wheel 28 mounted at the lower end thereof and the rear leg member 24 has a wheel 30 mounted at the lower end thereof. An axle 32 extends between the wheels 28 and 30. One or more cross-bars 34 are secured to side frame members 16 and 18 and extend therebetween. A cross-member 36 is secured to leg members 22 and 26, as seen in the drawings. The lower forward end of cross-member 36 has a serrated cutting edge 38. The cross-member 36 includes an elongated plate 40 at its lower rear end which extends upwardly and rearwardly. The numeral 42 refers to an elongated coil spring which is positioned adjacent plate 40. The ends of spring 42 are secured to cross-member 36 so that the spring 42 is yieldably held in engagement with plate 40. Preferably the coil spring 42 is covered with a covering material such as shrink wrapped plastic or tape. A roll of masking tape paper 43 extends between leg members 20 and 24, as seen in the drawings.

A horizontally disposed axle or shaft 44 is secured to the rear leg member 24 of side frame member 18. A roll of masking tape 46 is rotatably mounted on axle 44 in conventional fashion. For purposes of description, masking tape 46 will be described as having an upper side 48, a lower side 50, a first side edge 52 and a second side edge 54. The lower side 50 of tape 46 has an adhesive thereon. To this point, everything described above is available on the market.

Device 10 includes a vertically disposed mounting plate 56 having a forward end 58, a rearward end 60, an upper end 62, a lower end 64, an outer side 66, and an inner side 68. Mounting plate 56 has its first end 58 secured to rear leg member 24 of side frame member 18 by bolts or the like and has its second end 60 secured to front leg member 26 of side frame member 18 by bolts or the like. The configuration of mounting plate 56 will vary depending upon the particular cart 12 to which it is attached.

Figure 2:
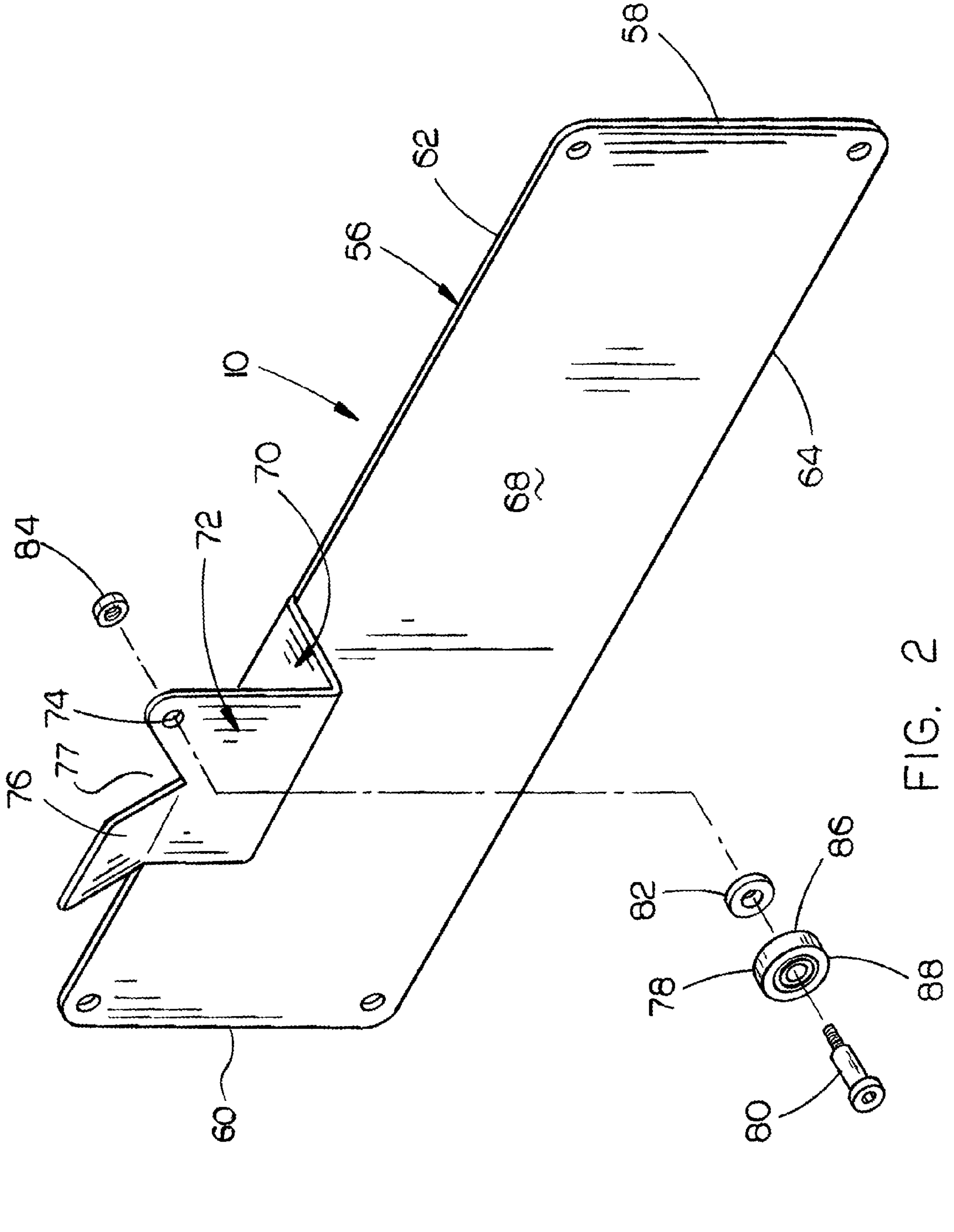
FIG. 2 is an exploded perspective view of the device of this invention.

Mounting plate 56 includes a horizontally disposed support member 70 which extends inwardly from the upper end 62 thereof. A vertically disposed support member 72 extends upwardly from the inner end of support member 70. The upper forward end of support member 72 has an opening 74 formed therein. Support member 72 has an inclined deflector plate 76 at its forward end which extends upwardly and inwardly with respect to support member 72. A generally V-shaped notch 77 extends downwardly into support member 72 as seen in FIG. 2.

A roller 78 is rotatably secured to support member 72 at the inner side thereof by a bolt or shaft 80, spacer washer 82 and nut 84. Bolt 80 extends through roller 78, spacer washer 82 and through opening 74 so as to be positioned at the inner side of support member 72 and spaced inwardly therefrom. For purposes of description, roller 78 will be described as having an outer side 86 and an inner side 88.

Figure 3:
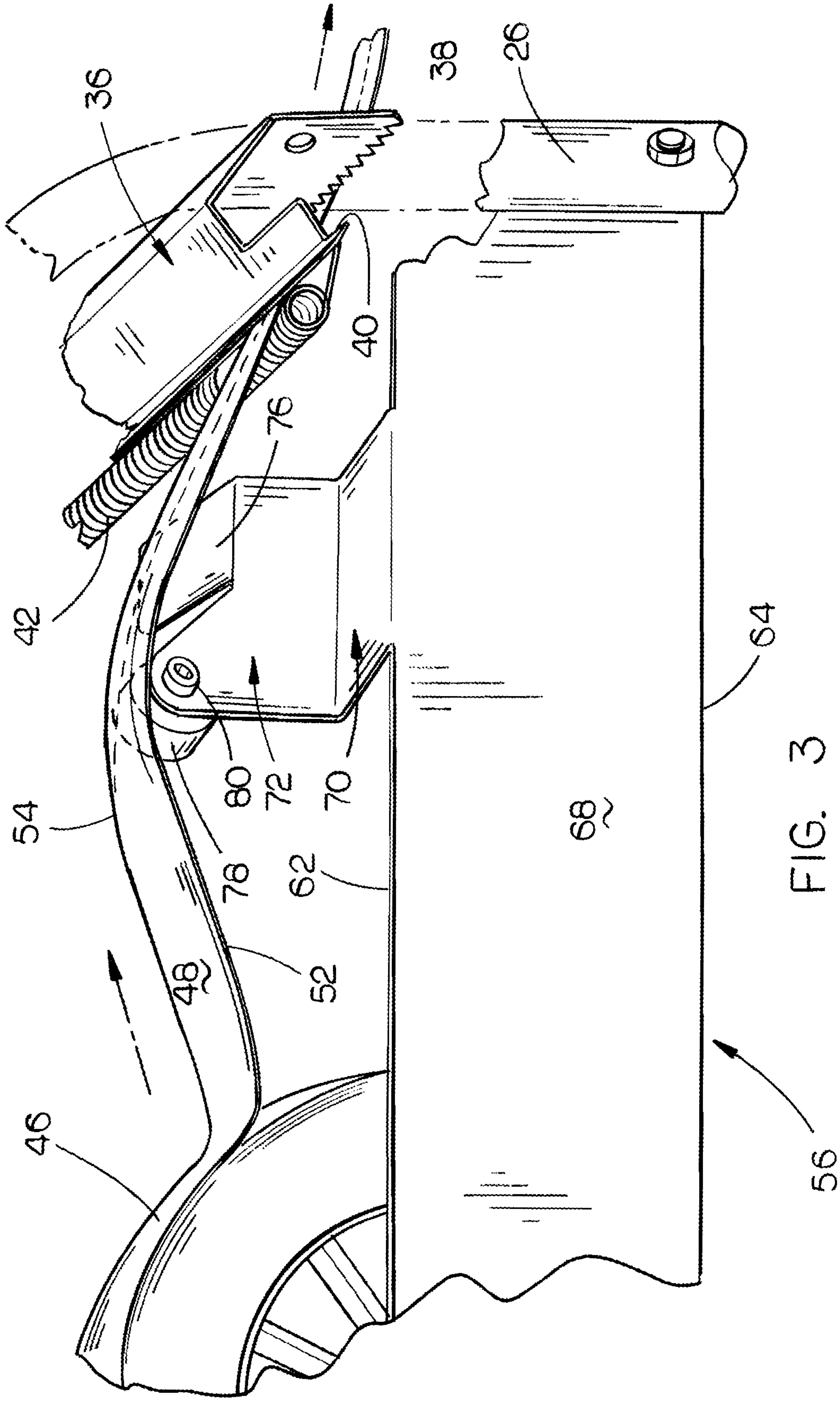
FIG. 3 is a partial side perspective view illustrating the manner in which masking tape is pulled from a roll of masking tape over and through the device of this invention.
Figure 5:
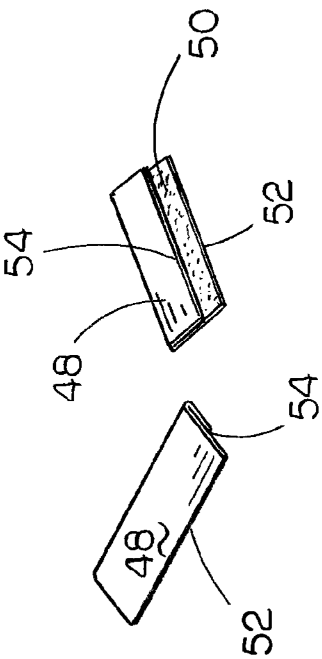
FIG. 5 illustrates the masking tape after it has been folded upon itself.
Figure 4:
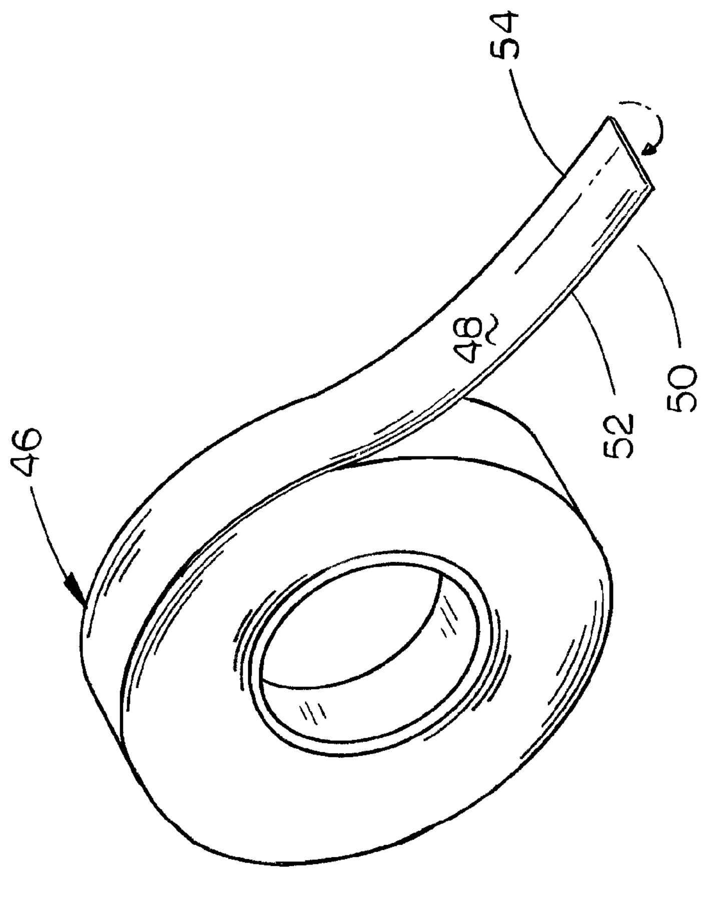
FIG. 4 is a perspective view of a roll of masking tape.
Figure 6:
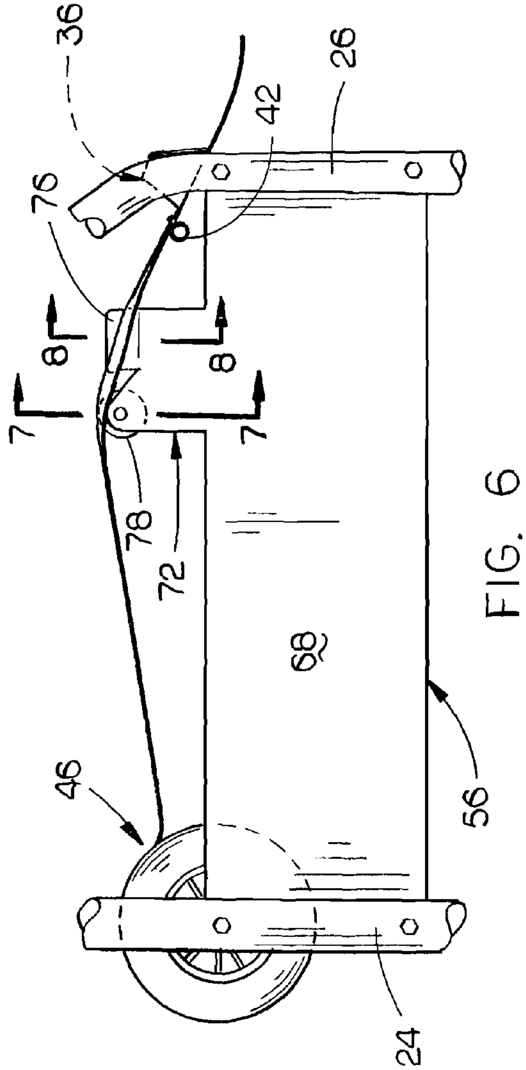
FIG. 6 is a partial side view illustrating the manner in which the masking tape is passed over and through the device of this invention.
Figure 9:
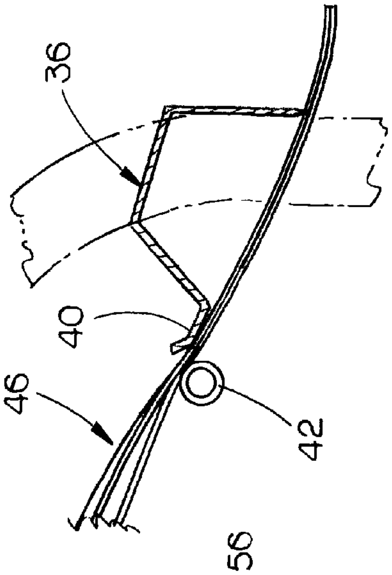
FIG. 9 is a partial sectional view illustrating the manner in which the partially folded tape is passed over a spring which is an integral part of the dispensing cart to which the device is mounted.
Figure 8:
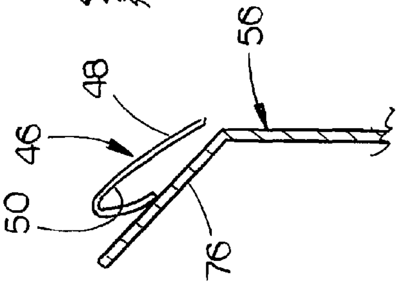
FIG. 8 is a partial sectional view illustrating the manner in which the masking tape is folded upon itself as it passes over the deflector plate of the invention.
Figure 7:
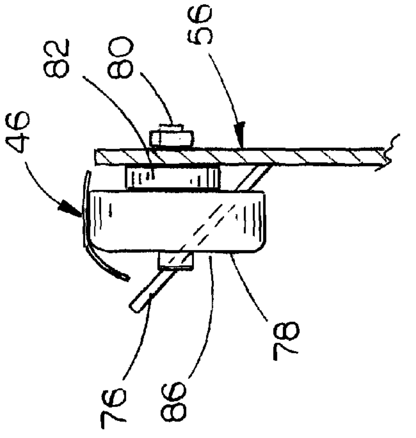
FIG. 7 is a partial sectional view illustrating the manner in which the masking tape is pulled over the roller of the device.

The device 10 functions as follows. The masking tape 46 is manually pulled from the roll of masking tape and is pulled over the roller 78, past the deflector plate 76, over the spring 42, beneath the plate 40 and beneath the cutting edge 38. As the tape 46 is pulled over the roller 76, the second side edge 54 of the tape 46 moves downwardly with respect to the roller 76 as illustrated in FIGS. 3 and 7 to partially fold the tape 46. As the partially folded tape passes over the deflector plate 76, the tape 46 is further folded as illustrated in FIG. 8. The partially folded tape 46 then passes over the spring 42 beneath plate 46 which presses tape 46 together to the shape of FIG. 5 so that a portion of the adhesive side 50 of tape 46 is exposed to enable the exposed portion of the tape 46 to be adhered to the desired surface.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A masking tape folding device for use with a masking tape dispenser having a roll of masking tape rotatably mounted therein about a horizontal axis with the masking tape having an upper side, an adhesive lower side, a first edge and a second edge, comprising:

a vertically disposed mounting plate configured to be secured to the dispenser and which is horizontally spaced from the roll of masking tape;

said mounting plate having an upper end, a lower end, a first end, a second end, an inner side and an outer side;

said mounting plate having a horizontally disposed first support member extending inwardly from said upper end thereof;

said first support member having inner and outer ends;

said mounting plate also having a vertically disposed second support member which extends upwardly from said inner end of said first support member;

said second support member having a first end, a second end, a lower end, an upper end, an inner side and an outer side;

said second support member including an inclined deflector plate portion which extends upwardly and inwardly therefrom at said second end thereof;

said deflector plate portion having an upper surface, a lower surface, an upper end and a lower end;

said second support member having a first opening formed therein adjacent said first end thereof and adjacent said upper end thereof;

a horizontally disposed roller support shaft positioned in said first opening;

said roller support shaft having an inner end positioned inwardly of said second support member;

a roller rotatably mounted on said inner end of said roller support shaft;

said second support member having a generally v-shaped notch formed therein which extends downwardly thereinto from said upper end thereof to said lower end of said deflector plate portion;

said roller being positioned whereby a portion of the masking tape being pulled from the roll of masking tape will engage said roller and pass thereover thereby causing the second edge of masking tape to be partially folded downwardly;

said deflector plate being positioned relative to said roller whereby the partially folded second edge of the masking tape will subsequently engage said upper surface of said deflector plate portion thereby causing the partially folded second edge of the masking tape to be further folded towards the adhesive lower side of the masking tape as the masking tape is pulled from the roll of masking tape.

2. The device of claim 1 wherein the masking tape dispenser further includes a spring for pressing the folded second edge of the masking tape into adhesive engagement with the adhesive lower side of the masking tape after the masking tape has disengaged from the deflector plate portion.

3. A tape dispensing system comprising, in combination:

a masking tape dispenser and a roll of masking tape rotatably mounted thereon about a horizontal axis with the masking tape having an upper side, an adhesive lower side, a first edge and a second side edge;

said making tape dispenser having a tape discharge side;

said masking tape dispenser having an elongated horizontally disposed spring at said tape discharge side which is disposed transversely to the masking tape being dispensed therefrom;

a vertically disposed mounting plate configured to be secured to the dispenser and which is horizontally spaced from the roll of masking tape;

said mounting plate having an upper end, a lower end, a first end, a second end, an inner side and an outer side;

said mounting plate having a horizontally disposed first support member extends inwardly from said upper end thereof;

said first support member having inner and outer ends;

said mounting plate also having a vertically disposed second support member which extends upwardly from said inner end of said first support member;

said second support member having a first end, a second end, a lower end, an upper end, an inner side and an outer side;

said second support member including an inclined deflector plate portion which extends upwardly and inwardly therefrom at said second end thereof;

said deflector plate portion having an upper surface, a lower surface, an upper end and a lower end;

said second support member having a first opening formed therein adjacent said first end thereof and adjacent said upper end thereof;

a horizontally disposed roller support shaft positioned in said first opening;

said roller support shaft having an inner end positioned inwardly of said second support member;

a roller rotatably mounted on said inner end of said roller support shaft;

said second support member having a generally v-shaped notch formed therein which extends downwardly thereinto from said upper end thereof to said lower end of said deflector plate portion;

said roller being positioned whereby a portion of the masking tape being pulled from the roll of masking tape will engage said roller and pass thereover thereby causing the second edge of masking tape to be partially folded downwardly;

said deflector plate being positioned relative to said roller whereby the partially folded second edge of the masking tape will subsequently engage said upper surface of said deflector plate portion thereby causing the partially folded second edge of the masking tape to be further folded towards the adhesive lower side of the masking tape as the masking tape is pulled from the roll of masking tape.

4. The device of claim 3 wherein the masking tape dispenser further includes a spring for pressing the folded second edge of the masking tape into adhesive engagement with the adhesive lower side of the masking tape after the masking tape has disengaged from the deflector plate portion.

* * * * *